UNITED STATES PATENT OFFICE.

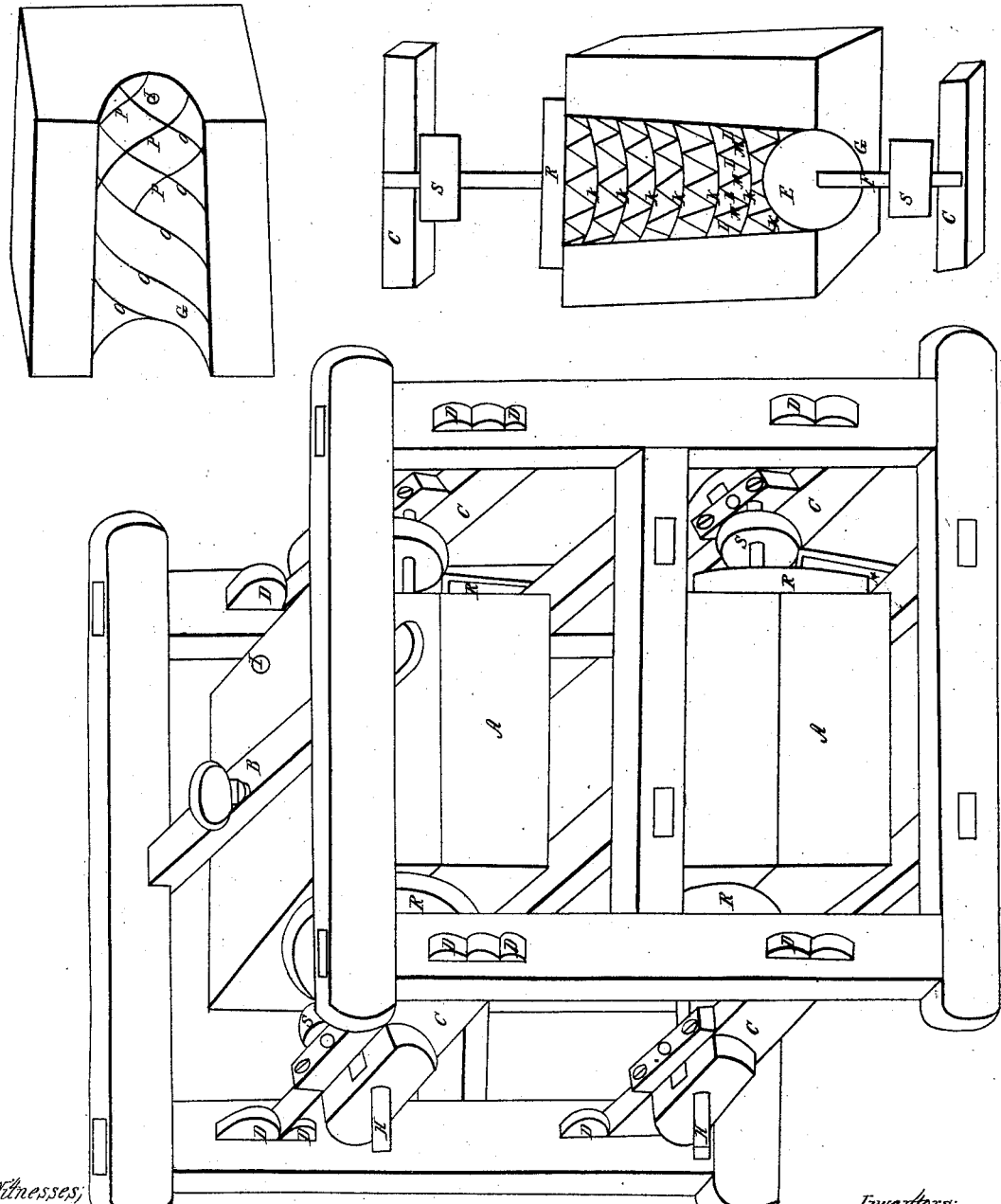

F. BURDICK AND L. BURDICK, OF SOUTH EAST, NEW YORK.

MACHINE FOR HULLING RICE.

Specification of Letters Patent No. 20,138, dated May 4, 1858.

*To all whom it may concern:*

Be it known that we, FRANCIS BURDICK and LODOWICK BURDICK, both of the town of South East, in the county of Putnam and State of New York, have invented a new and Improved Machine for Hulling and Dressing Rice and other Grain; and we do hereby declare that the following is a full and exact description thereof, reference being had to the accompanying drawings and to the letters of reference marked thereon.

A substantial frame work of wood or iron supports the machine, which consists of two stone mills (A,) as hereinafter described. It will be seen from the accompanying plans that one mill is firmly secured on the bed-work of the frame, and the other is placed directly above it upon a similar support; the frame being of sufficient height to allow a cross-bar (B,) to be placed between the upper mill and the upper plate to secure this mill in its proper position. Two movable cross-bars (C,) are placed in each end of the frame work to support and regulate the runners of each mill, sliding wedges (D,) being placed above and below the tenons to modify the distance between each runner and its corresponding concave, that, by means of this adjustment and another hereinafter described, grains of different lengths may be operated upon by the machine.

The stone cylindrical runners (E,) are to be made of a suitable length to perform the work, say from one to three feet, longer or shorter as required. They are to be in the form of a frustum of a cone, the smaller diameter being eleven inches, and the larger diameter, fifteen inches, for a runner three feet in length. The same proportion is to be observed should the machine be of a different length. A hole will be drilled lengthwise through the center of each runner, of sufficient size to admit supporting iron shafts (F,) of suitable dimension say two inches in diameter. Near each end of said shafts, journals will be turned to run in boxes securely fastened to cross-bars (C,) at each extremity of the frame. The runners (E) are inclosed in corresponding concaves (G), each formed from two blocks of stone, one half the concave being cut from one and one half from the other, and so made that the runner fits the concave; the concaves are fastened to the bed work as above described.

At each end of the iron shafts, adjusting screws (H) are placed, which upon being turned backward and forward, coöperate with the contrivance hereinbefore described in producing a suitable space between the runners and concaves, for the admission of grain of different lengths. The rice to be hulled and dressed is to be fed into the machine at the small end of the runners through the aperture marked (I). The object of combining two stone mills of like dimensions in one frame is that the outer hull of the rice may be taken off in the upper machine; and, the hulls being separated from the rice in passing to the lower one, the second coating may there be removed, and the rice comes out fully dressed.

The furrows or dress of the mill are of a peculiar character, and are described as follows: they are cut about ($\frac{1}{4}$) one-fourth of an inch deep, and about ($\frac{1}{2}$) one-half of an inch wide. A set of parallel furrows (K,) encircle the runners about three inches distant from each other. Another series of furrows surround the runners from end to end in the form of right and left hand screws, being dressed only in the alternate spaces formed by the parallel furrows (K). The grooves forming the right-hand screws (L,) are to be drawn parallel to each other at about the same distance apart as the parallels before mentioned. The left hand screws (M,) are to be similarly drawn, and dressed only in those spaces which are not dressed in the right hand screws. These right and left hand screw furrows are dressed in alternate spaces only, for the purpose of retarding the progress of the grain, and thereby permitting the mill to do more work on the grain than if otherwise dressed. We find that a single screw does not produce a requisite amount of friction or wear on the rice or other grain; but by the addition of the counter screw, a double amount of wear is produced, one screw drawing the grain to the large end of the runner, while the other tends to draw it back to the small end; and this double action as supposed to keep the grain in a revolving motion while passing through the mills. The greater centrifugal motion of the large end of the runners draws the grain through the mills to the place of discharge (N). If a more than ordinary feed should be required, leaders in favor of the right hand screw should be cut from the small end of the runners, one third the length of the same. The dress of the concaves consists of a series of left hand screws (O,) cut the whole length of the stone, which forms an additional check on the grain, also a series of right-hand screws (P), to be cut about one-third (⅓) the length of the concave, for the purpose of facilitating the progress of the grain through the mill.

A suitable partition (R) is to be placed at each end of the machines to prevent a waste of the grain when the mills are in operation.

Any propelling power may be adapted to this machine for the purposes of operation; the runners are intended to revolve at about the rate of eight hundred times per minute, and the driving pulleys (S,) are to be regulated accordingly.

What we claim and desire to secure by Letters Patent is—

The peculiar dress in our horizontal stone mill composed of the frustum of a cone and its corresponding concave constructed and operating as, and for the purpose above described.

FRANCIS BURDICK.
LODOWICK BURDICK.

Witnesses:
JONA. HAVEN BURDICK,
DANIEL BAKER.